2,850,387

α-AMINO ACID DERIVATIVE AND FATS AND OILS CONTAINING SAME

Bernard W. Town, Mount Vernon, N. Y., assignor to Schwarz Laboratories, Inc., a corporation of New York No Drawing. Application January 27, 1955
Serial No. 484,572

8 Claims. (Cl. 99—14)

This invention relates to amino acid derivatives, and more particularly to derivatives of naturally occurring amino acids, which derivatives are stable when added to food products or other compositions in which the free amino acids tend to be unstable.

As conducive to a clear understanding of the invention, it is noted that lysine ($\alpha,\epsilon$-diamino-caproic acid) is one of the amino acids essential for natural growth and nutrition in mammals. Although it is a normal constituent of many food stuffs, the presence of two amino groups in the molecule makes lysine particularly susceptible to "browning" or Maillard reactions during the cooking of food. These reactions, which involve essentially irreversible condensations between amines and sugars, destroy the nutritional value of that portion of the lysine which is condensed. As a result, many prepared food products contain less lysine than is nutritionally desirable. Furthermore, exogenous lysine which might be added to enrich the product also enters into these same reactions and becomes nutritionally unavailable, and tends to cause undesirable browning of the food product, as in bread and other baked goods.

The above mentioned problem of "browning" encountered in the case of lysine also arises in connection with other naturally occurring α-amino acids, among the more important of which may be mentioned leucine ($\alpha$-amino-isocaproic acid $(CH_3)_2CHCH_2CH(NH_2)COOH$), isoleucine ($\alpha$-amino-$\beta$-methyl valeric acid, $$C_2H_5(CH_3)CHCH(NH_2)COOH)$$

valine ($\alpha$-amino-isovaleric acid, $$(CH_3)_2CHCH(NH_2)COOH)$$

methionine ($\alpha$-amino-$\gamma$-methyl mercapto butyric acid, $$CH_3SCH_2CH_2CH(NH_2)COOH)$$

and phenylalanine ($\alpha$-amino-$\beta$-phenylpropionic acid, $$C_6H_5CH_2CH(NH_2)COOH$$

These naturally occurring acids are hereinafter referred to as α-amino acids.

It is among the objects of this invention to provide α-amino acid derivatives which are stable when added to food products, i. e., will not condense in Maillard reactions and which are suitable for addition to foods, particularly from the standpoint of improving the nutritional value of the foods.

It is a further object of this invention to provide α-amino acid derivatives of such nature that they provide nutritionally available amino acids to the animal body, either by direct utilization of the amino acid derivatives or by action of naturally occurring enzymes which will convert the amino acid derivatives to utilizable form in the body.

Other objects and advantages of this invention will be apparent from the following detailed description thereof.

I have made the surprising discovery that the reaction products of α-amino acids with saturated or unsaturated aliphatic fatty acids containing from 10 to 24 carbon atoms, preferably from 12 to 20 carbon atoms, result in amino acid derivatives which are (a) remarkably stable, i. e., will not condense in Maillard reactions, (b) slowly split by pancreatic enzymes, thus releasing nutritionally desirable amino acids, and (c) result when ingested as a normal constituent of food in the release of fatty acids by hydrolysis of the acyl group in vivo in a form that can be readily assimilated by the body; this is particularly the case in connection with esters of fatty acids containing from 16 to 20 carbon atoms, such as the palmityl, stearyl, oleyl and arachidyl esters.

Still another advantage of the novel α-amino acid derivatives of this invention is that they are fat soluble. Accordingly, they can be used to enrich fats and oils used in shortenings, and to enrich butter, margarine, peanut butter, cheeses and other bread spreads.

The novel α-amino acid derivatives of this invention can readily be prepared by reacting the amino acid in aqueous alkaline solution with an acyl chloride containing from 10 to 24 carbon atoms, preferably from 12 to 20 carbon atoms, while maintaining the mixture at a pH above 7.

Examples of the preparation of α-amino acid derivatives embodying this invention are given below. It will be understood the invention is not limited to these amino acid derivatives, nor to their production by the procedures hereinafter set forth. In all of the examples mM means millemols, i. e., one thousandth of a mol.

Example I.—Di-palmityl-L-lysine 2.5 grams L-lysine hydrochloride (13.7 mM) are dissolved in 65 ml. of water to which sufficient 2 N NaOH has been added to make the solution alkaline to phenolphthalein. While stirring, 8.4 grams (30.7 mM) of palmitoyl chloride warmed sufficiently to maintain fluidity, is added dropwise with simultaneous addition of 2 N NaOH sufficient to maintain the alkalinity of the solution. A heavy, gelatinous precipitate forms rapidly. After all the palmitoyl chloride has been added and the mixture has been stirred 5 to 10 minutes, 5 N HCl is added to bring the pH to about 1.0 whereupon the precipicate changes to a granular form which is readily filtered. The filtered and washed precipitate is dried and recrystallized from 70 ml. absolute ethanol, yielding 6.8 grams di-palmityl-L-lysine, M. P. 100°–103° C. Yield: 80% of theoretical. Total nitrogen of this product is 4.3% (the calculated nitrogen value for di-palmityl lysine is 4.5%). Free amino nitrogen is negligible.

Example II.—Di-stearyl-L-lysine 5 grams (27.4 mM) of L-lysine·HCl are dissolved in 100 ml. water to which sufficient 2 N NaOH has been added to make the solution just alkaline to brom thymol blue. While stirring, to this mixture is added, dropwise, 18 grams (59.3 mM) of stearoyl chloride warmed sufficiently to maintain fluidity, and, simultaneously, sufficient 2 N NaOH to maintain the alkalinity of the solution. A gelatinous precipitate forms rapidly, which becomes granular on acidification to pH 1.0 with 5 N HCl. The precipitate is filtered, washed, and dried, and recrystallized from 50 ml. boiling absolute ethanol to which a few drops of concentrated HCl have been added. The yield of crystalline di-stearyl-L-lysine is 16.8 grams (78% of theoretical) M. P. 110°–113° C. The total nitrogen of the sample was 3.4% (the calculated nitrogen value for di-stearyl-L-lysine is 3.58%). There is negligible free amino nitrogen present.

The substitution of oleyl chloride or arachidoyl chloride for the chloride in the above examples result in the formation of di-oleyl-L-lysine and di-arachidyl-L-lysine, respectively.

Di-acyl lysine prepared by the method of Examples I and II, when analyzed for free amino nitrogen by the method of Van Slyke shows negligible quantities, indicating substantially complete substitution of one hydrogen of each amino group.

In the above examples the lysine hydrochloride is used because it is readily available. Use of the hydrochloride requires a neutralization treatment; sodium hydroxide is used in the examples for this purpose. The free amino acid can, of course, be used instead of the hydrochloride.

*Example III.—N-palmityl-L-valine*

3 grams L-valine (25.6 mM) are dissolved in 100 ml. water to which sufficient 2 N NaOH has been added to make the solution just alkaline to brom thymol blue. While stirring, to this mixture is added, dropwise, 7.5 grams (27.5 mM) of palmitoyl chloride warmed sufficiently to maintain fluidity, and, simultaneously, sufficient 2 N NaOH to maintain the alkalinity of the solution. A gelatinous precipitate forms rapidly, which becomes granular on acidification to pH 1.0 with 5 N HCl. The precipitate is filtered, washed, and recrystallized from boiling absolute ethanol as described in the previous example. Yield is 8.8 grams N-palmityl-L-valine, 88% of theoretical.

*Example IV.—N-palmityl L-phenylalanine*

1.65 grams (10 mM) of L-phenylalanine are dissolved in 100 ml. of warm water to which sufficient 2 N NaOH has been added to make the solution just alkaline to brom thymol blue. While stirring, to this mixture is added, dropwise, 3 grams (11 mM) of palmitoyl chloride, warmed sufficiently to maintain fluidity, and, simultaneously, sufficient 2 N NaOH to maintain the alkalinity of the solution. A gelatinous precipitate forms rapidly, which is worked up as described in the previous examples. Yield is 3.4 grams N-palmityl L-phenylalanine—81% of theoretical.

The production of acyl derivatives of the other naturally occurring $\alpha$-amino acids can readily be prepared following the same procedure as in the above examples, substituting, of course, the appropriate $\alpha$-amino acid and appropriate acyl chloride to obtain the desired product. In the case of the monoamino acid one hydrogen atom of the amino group is replaced by the acyl radical; in the case of the diamino acid one hydrogen atom of each amino group is replaced by an acyl group.

The following comparative test demonstrates the stability of di-palmityl-lysine as compared with lysine in the Maillard reaction.

1 gram of di-palmityl-L-lysine and 0.2 gram of glucose were ground together in a mortar, and 10 ml. water were added gradually to form a smooth suspension. The pH was adjusted to approximately 6. A control mixture was similarly prepared using .28 gram L-lysine hydrogen chloride, 0.2 grams glucose, and 0.72 gram palmitic acid ground in 10 ml. water and adjusted to pH 6. The two samples were incubated at 50° C. for 14 days and compared as to color. There was substantially no change in color of the sample containing di-palmityl-L-lysine, whereas the control had become brown.

Similar comparative tests of $\alpha$-amino acid derivatives embodying this invention with the free amino acid establishes that the amino acid derivatives of this invention are comparatively stable, i. e., will not "brown" when added to food products containing sugars upon heating to moderate temperatures, e. g., about 50° C., or even higher, whereas the free amino acids will result in discoloration of the food product.

The following examples illustrate certain fat and oil embodiments of the invention, i. e., fats and oils containing dissolved therein the $\alpha$-amino acid derivatives of this invention. In these examples the concentration of $\alpha$-amino acid derivative in the fat or oil is from about 10% to about 20% based on the weight of the fat or oil. The concentration may, of course, be varied, as desired.

For comparative purposes data is given on the free acid also. It will be noted that in every case the $\alpha$-amino acid derivative embodying this invention is soluble in the fat or oil, whereas the corresponding free amino acid is insoluble. It will be understood the invention is not limited to these examples.

*Example V.—Cooking oil*

5 grams of Mazola (refined edible corn oil) cooking oil are warmed to 100° C. and .3 gram of di-stearyl-L-lysine is stirred into it. A clear solution results. When the experiment is repeated with 0.1 gram of L-lysine·HCl a turbid suspension is formed. Thus, while 1 gram of di-stearyl-L-lysine dissolves readily in the cooking oil, ⅕ as much of the free acid results in a turbid suspension.

*Example VI.—Peanut oil*

10 grams of peanut oil are warmed on a water bath and .5 gram of di-arachidyl L-lysine is stirred into it. A clear solution results. When the experiment is repeated with 0.2 gram of L-lysine, a turbid suspension is formed.

*Example VII.—Margarine*

5 grams of margarine are melted on a water bath and .3 gram of N-palmityl valine is stirred into it. A clear solution results. When the experiment is repeated with 0.1 gram of L-valine, a turbid suspension is formed.

As many widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. A vehicle for enriching with amino acids foods subjected to cooking and which vehicle will not cause undesirable browning of the food and will result in the amino acids remaining in the nutritionally available form, said vehicle consisting essentially of a fat having dissolved therein to form a true solution from about 10% to about 20% by weight of an N-acylated aliphatic $\alpha$-amino acid in which all available amino groups are mono-acylated and the acyl radical is derived from a fatty acid from the group consisting of saturated and unsaturated fatty acids containing from 10 to 24 carbon atoms, and the $\alpha$-amino acid is from the group consisting of leucine, isoleucine, lysine, valine, methionine and phenylalanine, is in a nutritionally available form and will not condense in Maillard reactions at a temperature of about 50° C.

2. A vehicle for enriching with amino acids foods subjected to cooking and which vehicle will not cause undesirable browning of the food and will result in the amino acids remaining in the nutritionally available form, said vehicle consisting of a true solution in which the solvent is from the group consisting of fat and oil and the solute is an N-acylated aliphatic $a$-amino acid in which all available amino groups are mono-acylated and the acyl radical is derived from a fatty acid from the group consisting of saturated and unsaturated fatty acids containing from 10 to 24 carbon atoms, and the $\alpha$-amino acid is from the group consisting of leucine, isoleucine, lysine, valine, methionine and phenylalanine, is in a nutritionally available form and will not condense in Maillard reactions at a temperature of about 50 C., said solute being present in an amount of from about 10% to about 20% by weight based on the weight of the solvent.

3. A food fat solution consisting of a solvent from the group consisting of fats and oils having dissolved therein from about 10% to about 20% by weight based on the weight of solvent of $\alpha N, \epsilon N$-dipalmityl lysine, in which solution the $\alpha N, \epsilon N$-dipalmityl lysine is in a nutritionally available form and will not condense in Maillard reactions at a temperature of about 50° C.

4. A food fat solution containing as the solute from about 10% to about 20% by weight of $\alpha$N,$\epsilon$N-dipalmityl lysine, in which solution the $\alpha$N,$\epsilon$N-dipalmityl lysine is in a nutritionally available form and will not condense in Maillard reactions at a temperature of about 50° C. and the solvent is from the group consisting of fats and oils, said solute being completely dissolved in said solvent.

5. A food fat solution containing as the solute from about 10% to about 20% by weight of $\alpha$N,$\epsilon$N-distearyl lysine, in which solution the $\alpha$N,$\epsilon$N-stearyl lysine is in a nutritionally available form and will not condense in Maillard reactions at a temperature of about 50° C. and the solvent is from the group consisting of fats and oils, said solute being completely dissolved in said solvent.

6. A food fat solution containing as the solute from about 10% to about 20% by weight of $\alpha$N,$\epsilon$N-diarachidyl lysine, in which solution the $\alpha$N,$\epsilon$-diarachidyl lysine is in a nutritionally available form and will not condense in Maillard reactions at a temperature of about 50° C. and the solvent is from the group consisting of fats and oils, said solute being completely dissolved in said solvent.

7. A food fat solution containing as the solute from about 10% to about 20% by weight of $\alpha$N,$\epsilon$N-dioleyl lysine, in which solution the $\alpha$N,$\epsilon$N-dioleyl lysine is in a nutritionally available form and will not condense in Maillard reactions at a temperature of about 50° C. and the solvent is from the group consisting of fats and oils, said solute being completely dissolved in said solvent.

8. A food fat solution containing as the solute from about 10% to about 20% by weight of N-palmityl-L-valine, in which solution the N-palmityl-L-valine is in a nutritionally available form and will not condense in Maillard reactions at a temperature of about 50° C. and the solvent is from the group consisting of fats and oils, said solute being completely dissolved in said solvent.

References Cited in the file of this patent

UNITED STATES PATENTS

| | | |
|---|---|---|
| 1,917,258 | Harris | July 11, 1933 |
| 2,063,987 | Dreyfus | Dec. 15, 1936 |
| 2,689,170 | King | Sept. 14, 1954 |

OTHER REFERENCES

Hackh's Chemical Dictionary, 3rd edition (1944), The Blakiston Company, Philadelphia, page 18.